United States Patent [19]

Rostoker et al.

[11] Patent Number: 5,623,494
[45] Date of Patent: Apr. 22, 1997

[54] ASYNCHRONOUS TRANSFER MODE (ATM) INTERCONNECTION SYSTEM FOR MULTIPLE HOSTS INCLUDING ADVANCED PROGRAMMABLE INTERRUPT CONTROLLER (APIC)

[75] Inventors: Michael D. Rostoker, Boulder Creek, Calif.; Sushant Verman, Mississauga, Canada; Richard Egan, San Carlos; Jerry E. Chow, Sunnyvale, both of Calif.

[73] Assignee: LSI Logic Corporation, Milpitas, Calif.

[21] Appl. No.: 472,475

[22] Filed: Jun. 7, 1995

[51] Int. Cl.⁶ .......................... H04Q 11/04; H04U 3/08
[52] U.S. Cl. ..................... 370/397; 370/402; 370/420
[58] Field of Search .......................... 370/85.13, 62.1, 370/94.1, 110.1, 60.1, 60; 395/739, 741, 733, 742

[56] References Cited

U.S. PATENT DOCUMENTS

| | | | |
|---|---|---|---|
| 5,446,726 | 8/1995 | Rostoker et al. | 370/17 |
| 5,481,725 | 1/1996 | Jayakumar et al. | 395/725 |
| 5,511,200 | 4/1996 | Jayakumar | 395/739 |

Primary Examiner—Douglas W. Olms
Assistant Examiner—Matthew C. Phillips
Attorney, Agent, or Firm—Poms, Smith, Lande & Rose

[57] ABSTRACT

A system of the invention connects an Asynchronous Transfer Mode (ATM) data network to a plurality of host units. The data network transfers data in the form of ATM cells. A plurality of ATM termination units are connected between the network and the host units respectively. Each termination unit includes a virtual channel memory for storing ATM cells; a processor for segmenting and reassembling the ATM cells stored in the memory; a network interface for transferring ATM cells including segmented Conversion Sublayer Payload Data Units (CS-PDU)s between the memory, the processor and an ATM network; and a host interface for transferring unsegmented CS-PDUs between the memory, the processor and a host unit. The processor of each termination unit includes a computing unit, and a programmable instruction memory for storing a program for controlling the computing unit. The system further includes an Advanced Programmable Interrupt Controller (APIC) system for distributing interrupts from the network to the host units. The APIC system includes a plurality of local units for prioritizing and passing interrupts to the termination units respectively; and an Input/Output (I/O) unit for receiving interrupts from the network, determining to which host units interrupts are addressed, and feeding interrupts to local units corresponding to host units to which interrupts are addressed. Termination units and corresponding APIC local units may be formed on a single integrated circuit chip, and the chip may include ATM I/O units and/or processors constituting the host.

46 Claims, 7 Drawing Sheets

ASYNCHRONOUS TRANSFER MODE (ATM) INTERCONNECTION SYSTEM FOR MULTIPLE HOSTS INCLUDING ADVANCED PROGRAMMABLE INTERRUPT CONTROLLER (APIC)

BACKGROUND OF THE INVENTION

1. Field of the Invention

The present invention generally relates to the art of microelectronic integrated circuits, and more specifically to an Asynchronous Transfer Mode (ATM) interconnection system for multiple hosts including an Advanced Programmable Interrupt Controller (APIC).

A example of an ATM system application is disclosed in copending U.S. patent application Ser. No. 08/354,682, entitled "HIGH SPEED SINGLE CHIP DIGITAL VIDEO NETWORK APPARATUS", filed Dec. 8, 1994 by Michael D Rostoker et al.

2. Description of the Related Art

Electronic data networks are becoming increasing widespread for the communication of divergent types of data including computer coded text and graphics, voice and video. Such networks enable the interconnection of large numbers of computer workstations, telephone and television systems, video teleconferencing systems and other facilities over common data links or carriers.

Computer workstations are typically interconnected by local area networks (LAN) such as Ethernet, Token Ring, DECNet and RS-232, whereas metropolitan, national and international systems are typically interconnected by wide area networks (WAN) such as T1, V3.5 and FDDI.

LANs, WANs and the like themselves can be interconnected by devices known as hubs, bridges and routers in an unlimited configuration. Although the distinction between these interconnection devices is becoming increasingly arbitrary, they are officially classified in accordance with the layer in the Open Systems Interconnection (OSI) model in which they operate.

Hubs interconnect devices using the Physical Layer, bridges utilize the Data Link layer, whereas routers operate using the Network layer. Hubs and bridges generally act merely as switches or funnels, whereas routers perform higher level functions including selecting optimal routes through the network for transmission of data packets or cells on an individual basis, and performing network management tasks such as forcing diagnostics operations and controlling other routers or nodes.

Whereas hubs and bridges generally operate on data which is formatted in a single protocol such as those listed above (uniprotocol), routers can typically identify and process data which can be in any one of several protocols (multiprotocol).

Interconnect devices, especially the more sophisticated routers, have typically been large, bulky and expensive units which operate at relatively low speed. As such, they limit the data throughput speed in the network in which they are installed. The reasons why routers have been so slow is that they are generally multichip units which transfer data being processed to and from Content Addressable Memory (CAM) chips which are separate from the processor, input/output (I/O) and other functional chips of the unit.

These transfer operations each require multiple system clock cycles which fundamentally limit the transfer speed. In addition, multiple latencies are present in the various paths by which data moves through the unit. The degree by which such latencies can be reduced, as well as the degree by which the size and cost of a multichip system can be reduced, are also fundamentally limited.

Asynchronous Transfer Mode (ATM) is a network protocol which is highly advantageous in that it enables high speed transmission of divergent types of data, including codes, video and voice. This is accomplished by breaking down the data to be transmitted into cells including 48 bit Conversion Sublayer Payload Data Unit (CS-PDUs) which contain the actual data, and a header and trailer. ATM can also be utilized as a universal protocol, replacing the protocols which are currently in use and are specific to LANs or WANs.

The header contains a virtual channel identifier and a virtual path identifier which identify the particular cell and its intended destination, and specify an optimal path through the network through which the cell should be routed to reach its destination. The header can also include numerous other information such as the type of data in the CS-PDU and attributes of the data, the sender and/or the destination.

The physical limitations discussed above regarding routers in general also applies to ATM routers, adapters and termination devices which interconnect an ATM network to a network node using a different protocol (or to a host such as a computer workstation).

A major problem which has inhibited the widespread deployment of ATM is that no single ATM protocol has been developed. A diverse assortment of ATM protocols have been developed by various manufacturers throughout the industry, some of which are so different as to be incompatible with each other. At least, the difference between protocols prevents the various higher level capabilities of the individual protocols from being universally utilized.

Congestion is a problem in all networks. This occurs when a large number of users feed data into the network at the same time. ATM cells need not be contiguous, so that computer coded data from one user can be interspersed with, for example, voice data from another user in a time divisioned manner. However, if too many users attempt to inject too much data into the network simultaneously, the bandwidth of the network can be exceeded resulting in substantial delays in data transmission, transmission errors and lost data.

Congestion is controlled by sensing the traffic in the network at the various nodes, sending special information packets between nodes to notify the other nodes of the magnitude and type of congestion, and delaying transmission of data at specified nodes in accordance with a predetermined congestion control algorithm.

ATM networks are relatively new, and the nature and patterns which congestion can take are not fully characterized. This makes it difficult to formulate and implement an effective congestion control algorithm. Similar to the variety of ATM protocols which are currently in use, a number of divergent congestion control algorithms have been devised and placed into service.

ATM routers, termination devices and other network elements are often hardwired with the particular manufacturer's protocol and congestion control algorithm. Although it is likely that a universal ATM standard will be developed in the near future and the multiprotocol problem will be eliminated, ATM systems will have to accommodate newly developed congestion control algorithms for an extended period of time until the nature of congestion can be better characterized or understood and handled. In the meantime, any changes to existing ATM systems require hard retooling, which is extremely time consuming and expensive.

A problem which has remained unsolved in networks including several or a large number of host units, which may be processors, is the efficient distribution and processing of interrupts generated by a system controller or received from an external interrupt signal bus, to the individual host units.

An interrupt is a signal which causes a processor to suspend its current operation in an orderly manner, and initiate another operation designated by an associated interrupt vector which constitutes a starting address for stored program code which controls the processor to perform the operation designated by the interrupt vector. Where the system is a router or hub, the interrupts can come from other routers, hubs, bridges or network units.

If several processors are capable of servicing an interrupt, and no specific processor is designated, some method of assigning a processor to service the interrupt is required. Typically, an auxiliary processor will be provided for the sole purpose of processing, prioritizing and distributing interrupts, thereby introducing delays into the overall operation of the system. If the interrupts cannot be processed fast enough, data overrun, data loss, and/or other system malfunction(s) can occur.

SUMMARY OF THE INVENTION

In accordance with the present invention, an electronic system such as a Single-Chip-Module (SCM), a Multi-Chip-Module (MCM), or a Board-Level-Product (BLP) includes a plurality of units or devices which are interconnected by a terminated transmission bus line.

A system of the invention connects an Asynchronous Transfer Mode (ATM) data network to a plurality of host units. The data network transfers data in the form of cells.

A plurality of ATM termination units are connected between the network and the host units respectively. Each termination unit includes a virtual channel memory for storing ATM cells; a processor for segmenting and reassembling the ATM cells stored in the memory; a network interface for transferring ATM cells including segmented Conversion Sublayer Payload Data Units (CS-PDUs) between the memory, the processor and an ATM network; and a host interface for transferring unsegmented CS-PDUs between the memory, the processor and a host unit.

A preferred ATM device and system is disclosed in copending U.S. patent application Ser. No. 08/354,682, entitled "HIGH SPEED SINGLE CHIP DIGITAL VIDEO NETWORK APPARATUS", filed Dec. 8, 1994 by Michael D. Rostoker et al, which is incorporated herein by reference.

The processor of each selected termination unit includes a computing unit, and a programmable instruction memory for storing a program for controlling the computing unit.

The system further includes an Advanced Programmable Interrupt Controller (APIC) system for distributing interrupts from the network to the host units. The APIC system includes a plurality of local units for prioritizing and passing interrupts to the selected termination units respectively; and an Input/Output (I/O) unit for receiving interrupts from the network, determining to which host units interrupts are addressed, and feeding interrupts to local units corresponding to host units to which interrupts are addressed.

Each ATM termination unit and corresponding APIC local unit are preferably formed on an integrated circuit chip or other semiconductor device. As used herein, the term "semiconductor device" refers to a silicon chip or die containing electronic circuitry and is more commonly referred to as a "semiconductor integrated circuit" or "integrated circuit." The term "semiconductor device assembly" or "integrated circuit assembly" refers to the silicon die and associated packaging containing the die, including conductive leads, such as ball bump, pins, surface mount gull wing and J leads, conductive tabs or balls at the periphery of a package and/or on the interior of a surface or the like, for connecting to a system circuit board, and internal connections of the die to the conductive leads such as bond wires, flip-chip or Tape Automated Bonding (TAB).

The term "semiconductor device assembly" or "integrated circuit assembly" may also refer to the silicon die and associated leadframe such as a tape carrier or package-less silicon die on a leadframe which may be encapsulated or not. The leadframe is connected to the package-less silicon die as is well known to those skilled in the art of semiconductor devices.

The present invention can be any assembly or device as described above. Several sets of termination units and local units can also be integrally formed on an integrated circuit chip, in addition to an ATM I/O unit and/or processors which constitute the host units. Alternatively, they can be formed on a Multi Chip Module (MCM) or other system level device having multiple integrated circuits.

Since the APIC system processes interrupts in parallel with the data processing operations, data overrun, data loss, and/or other similar system malfunction will not occur. Interrupts are prioritized and distributed in a highly efficient manner.

The operating program for the processor of each termination unit is stored, for example, in a volatile Instruction Random Access Memory (IRAM) or in the form of firmware which is downloaded at initialization. The program can be user designed to accommodate changes in ATM (or other) network protocols, congestion handling routines and the like, thereby overcoming the drawbacks of the prior art.

The present system provides numerous advantages over the prior art, especially in an embodiment in which an ATM termination unit and an APIC local unit are provided on a single integrated circuit chip.

Off-chip memory access delays and latencies involved in conventional network interconnect devices are substantially reduced or eliminated. Such integration enables the present system to operate at substantially higher speeds than conventional devices. The integrated circuit chip can be easily plugged into a socket in highly divergent types of network and host devices, thereby providing a highly desirable and cost-efficient replacement for conventional large, expensive and inflexible network interconnects and interrupt handling architecture.

The system cost is reduced through lower chip count, and the chip cost is reduced due to lower pin count. The APIC local unit can interface directly to an industry standard chip which includes an APIC I/O unit such that standard operation system software can be used with minimal modification.

In addition, power consumption is reduced due to a higher level of circuit integration, and the APIC interrupt bus can be scaled up to provide more ATM units in the system without any changes.

These and other features and advantages of the present invention will be apparent to those skilled in the art from the following detailed description, taken together with the accompanying drawings, in which like reference numerals refer to like parts.

DETAILED DESCRIPTION OF THE INVENTION

A system level device according to the present invention may specifically include Single-Chip-Modules (SCM), often including other electrical components (such as capacitors); Multi-Chip-Modules (MCM) having 2 or more integrated circuits with or without other electrical components; and board level products (BLP), such as those having multiple integrated circuits on a resin printed circuit or substrate board.

The invention further includes box level products ("Boxes"), which may include a combination of elements from the list of SCM, MCM, BLP, or other devices, and may also include a power supply.

Such system level devices specifically contemplated include digital (or other) memory storage systems, security systems, general purpose computers (such as personal computers, work stations, servers, mini computers, mainframe computers and super computers), transportation vehicles (such as airplanes, trains, automobiles, helicopters, rockets, missiles, boats, and submarines.

The contemplated system level devices further include subsystems for such vehicles, such as positioning (i.e. Global Positioning Systems (GPS)), display controllers, navigation, etc., entertainment systems (such as digital or other television, cameras, recorders, compact disc players/recorders, FM, AM, tape or other audio systems), communication systems such as "traditional" or cellular telephones, PBX, telephone switches, network controllers or encoder/decoders (i.e. token ring, Ethernet, etc.).

The contemplated devices yet further include subsystems or subassemblies for inclusion or attachment to such more complex system level products.

Figures 1, 3:
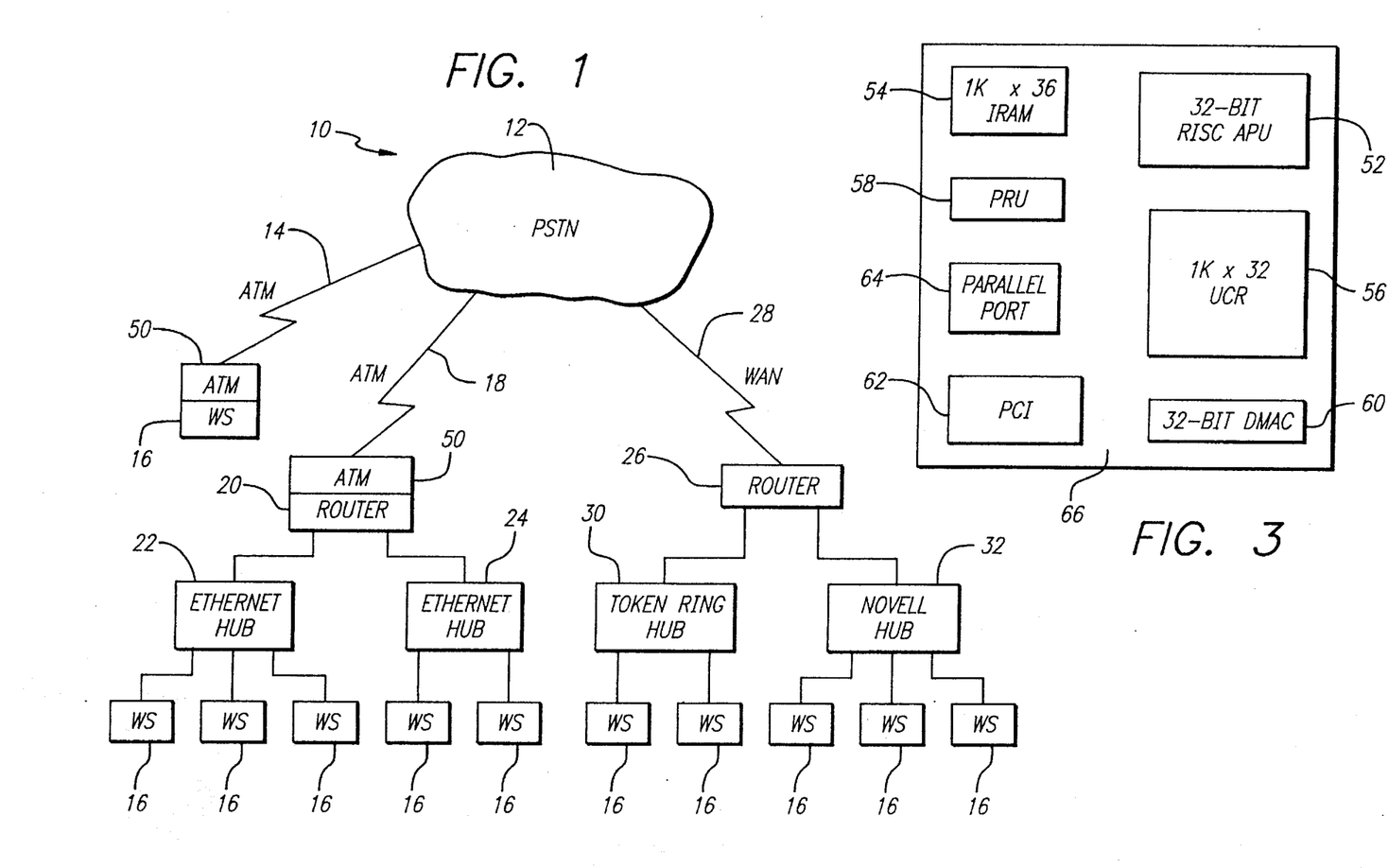
FIG. 1 is a block diagram of a hypothetical electronic data network incorporating elements of the present invention.
FIG. 3 is a diagram illustrating the organization of the main functional units of an asynchronous transfer mode (ATM) termination unit or ATMizer™ in accordance with the invention.

FIG. 1 illustrates a hypothetical data communications network 10 to which the present invention relates. The network 10 comprises a public service telephone network (PSTN) 12 which is generally represented as a cloud and interconnects users nationally and internationally using a combination of land lines and satellite links.

Although not illustrated in detail, the PSTN 12 comprises a number of multiprotocol routers which are capable of interconnecting network nodes using a variety of Wide Area Network (WAN) protocols, including T1, V.35 and FDDI. Asynchronous Transfer Mode (ATM) is a universal protocol which can be used for both WANs and Local Area Networks (LAN).

As illustrated in the exemplary network, the PSTN 12 is connected through an ATM link 14 to an end user such as a computer workstation 16 through an ATM termination device 50. The PSTN 12 is also connected through an ATM link 18 and a device 50 to a router 20, which in turn is connected to Ethernet hubs 22 and 24 through an Ethernet LAN network. The hubs 22 and 24 are connected to host units or work stations 16 through the Ethernet LAN.

Although the workstations are collectively designated as 16, they need not be similar, but can individually be constituted by diverse types of electronic communication devices such as telephone switching stations, commercial data collections terminals such as automatic bank teller machines, video and/or voice communication devices.

Further illustrated in the exemplary network 10 is a multiprotocol router 26 which is connected to the PSTN 12 through a wide area network link 28. The router 26 is connected to a Token Ring LAN hub 30 and a Novell LAN hub 32 through respective LAN interfaces. The hubs 30 and 32 are connected to workstations 32.

The device 50 can be a single chip unit which is being commercially produced as the ATMizer™ by LSI Logic Corporation of Milpitas, Calif. and been designed to control almost all aspects of ATM line operation from segmentation and reassembly of CS-PDUs and real-time data streams, to cell switching. Scatter-gather DMA, ATM layer operations, congestion control, statistics gathering, messaging, error monitoring, and diagnostic trouble-shooting of the ATM port are all under APU control.

In addition to Segmentation and Reassembly, the single chip ATMizer 50 allows active and intelligent control of all aspects of ATM station operation. The provision of high speed processing capabilities at the port interface allows for the implementation of systems that can deliver a level of operational control that can not be cost effectively delivered in a discrete implementation.

Figure 2:
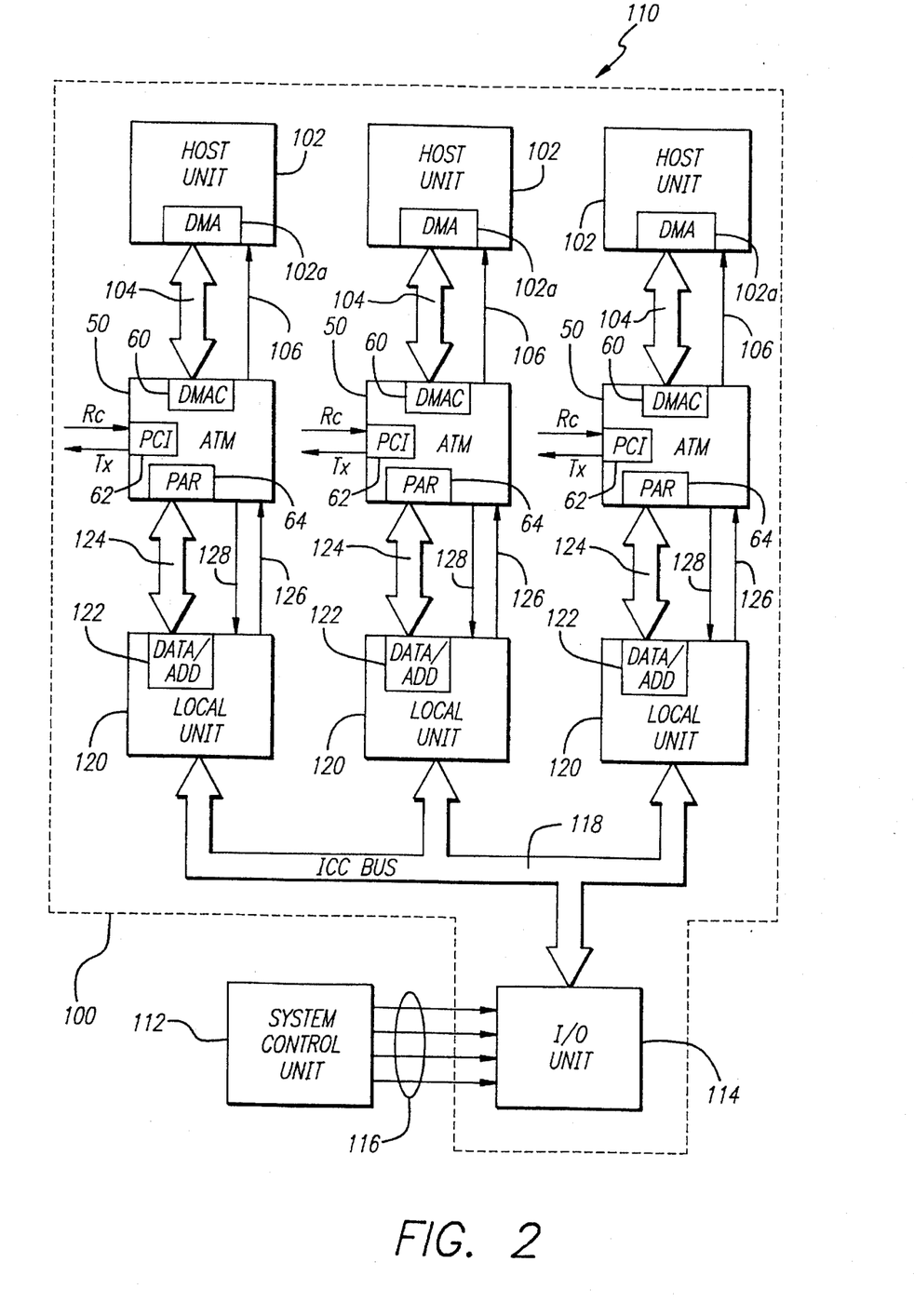
FIG. 2 is a diagram illustrating a system for connecting an Asynchronous Transfer Mode (ATM) data network to a plurality of host units in accordance with the present invention.

FIG. 2 illustrates a system 100 for connecting a plurality of host units 102 to an ATM network such as illustrated in FIG. 1. The host units 102 may be identical or different, and may be constituted by any applicable type of electronic device such as a computer workstation, video, audio or data communication unit, microprocessor, etc. In the latter case, one or more processors can be integrated onto a single integrated circuit chip together with other elements of the system 100.

As illustrated in FIG. 2, three host units 102 are connected to three ATM termination units 50 respectively which preferably implement the functionality of the ATMizer as will be described in detail below. The number of host units and respective termination units 50 is not limited within the scope of the invention, and can be one or any larger number. Where the termination units 50 are provided as separate modules and mounted on a Printed Circuit Board (PCB) with interconnections to the other units of the system 100, the units 50 can be constituted by unmodified ATMizer chips.

Each host unit 102 comprises a Direct Memory Access (DMA) interface 102a which is connected through a DMA-bus 104 to a DMA Controller (DMAC) 60 in the respective termination unit 50. Further illustrated are signal interrupt lines 106 by which the termination units 50 can apply interrupt signals to the host units 102. Each termination unit 50 comprises a Parallel Cell Interface (PCI) 62 by which the unit 50 is connected to the ATM network via a transmit line Tx and a receive line Rc.

In order to efficiently distribute and prioritize interrupts to the host units 102, an Advanced Programmable Interrupt Controller (APIC) system 110 is connected between an interrupt signal source and the termination units 50. As shown, the interrupt source is constituted by a system control unit 112, but the invention is not so limited. The interrupt source can be an external interrupt bus, a remote hub, bridge, router, or any other device, although not explicitly illustrated.

The APIC system 110 comprises an Input/Output (I/O) unit 114 which is connected to the system control unit 112 (or other interrupt signal source) by interrupt lines 116. There are typically 16 interrupt lines 116 which can be connected to the unit 112 as shown, or to different interrupt signal sources in any combination.

The I/O unit 114 receives and distributes interrupt signals from the unit 112 or other source over a ICC bus 118 to local units 120. Typically, the ICC bus 118 is a five wire synchronous bus consisting of four wires that are used for data transmission and arbitration, and one wire that is used to transmit clock signals.

Each local unit 120 comprises a data/address interface 122 which is connected through a data/address bus 124 to a parallel port 64 in the respective termination unit 50. The units 50 and 120 are further interconnected by an interrupt line 126 by which the local unit 120 can interrupt the termination unit 50, and an interrupt line 128 by which the termination unit 50 can interrupt the local unit 120.

APIC systems are known in the art per se, and a known APIC system can be combined with a plurality of ATMizers to implement the present system 100. For example, an ADVANCED PROGRAMMABLE INTERRUPT CONTROLLER 82489DX is commercially available from Intel which includes an I/O unit and a local unit on a single chip. The system 100 can be implemented using the I/O unit in one 82489DX chip, the local unit in the same chip, and the local units in two other 82489DX chips in combination with three ATMizers which are interconnected as illustrated.

Preferably, however, the entire system 100 or a subset of consisting several elements of the system 100 is provided on a single integrated chip as will be described below. This significantly increases the operating speed of the system 100 by reducing latencies and eliminating multiple clock cycles required for data transfer.

FIG. 3 illustrates the ATMizer 50 as a single chip unit which is fabricated on a substrate 66. The operating program for the processor of the ATMizer 50 is stored in a volatile Instruction Random Access Memory (IRAM) 54 in the form of firmware which is downloaded at initialization. The program can be user designed to accommodate changes in ATM network protocols and congestion handling routines, thereby overcoming the drawbacks of the prior art. Alternatively, the IRAM 54 can be embodied as a ROM, RAM, EPROM, FPGA, PLD, etc.

The ATMizer 50 provides ATM system designers with a Segmentation and Reassembly chip that can, through user firmware control, be used to implement ATM end stations and switching stations in a number of very divergent fashions. As such the ATMizer 50 is a device that provides a number of critical hardware functions that are "brought to life" by the firmware that a user downloads to the ATMizer 50's processor at system reset time.

Figure 4:
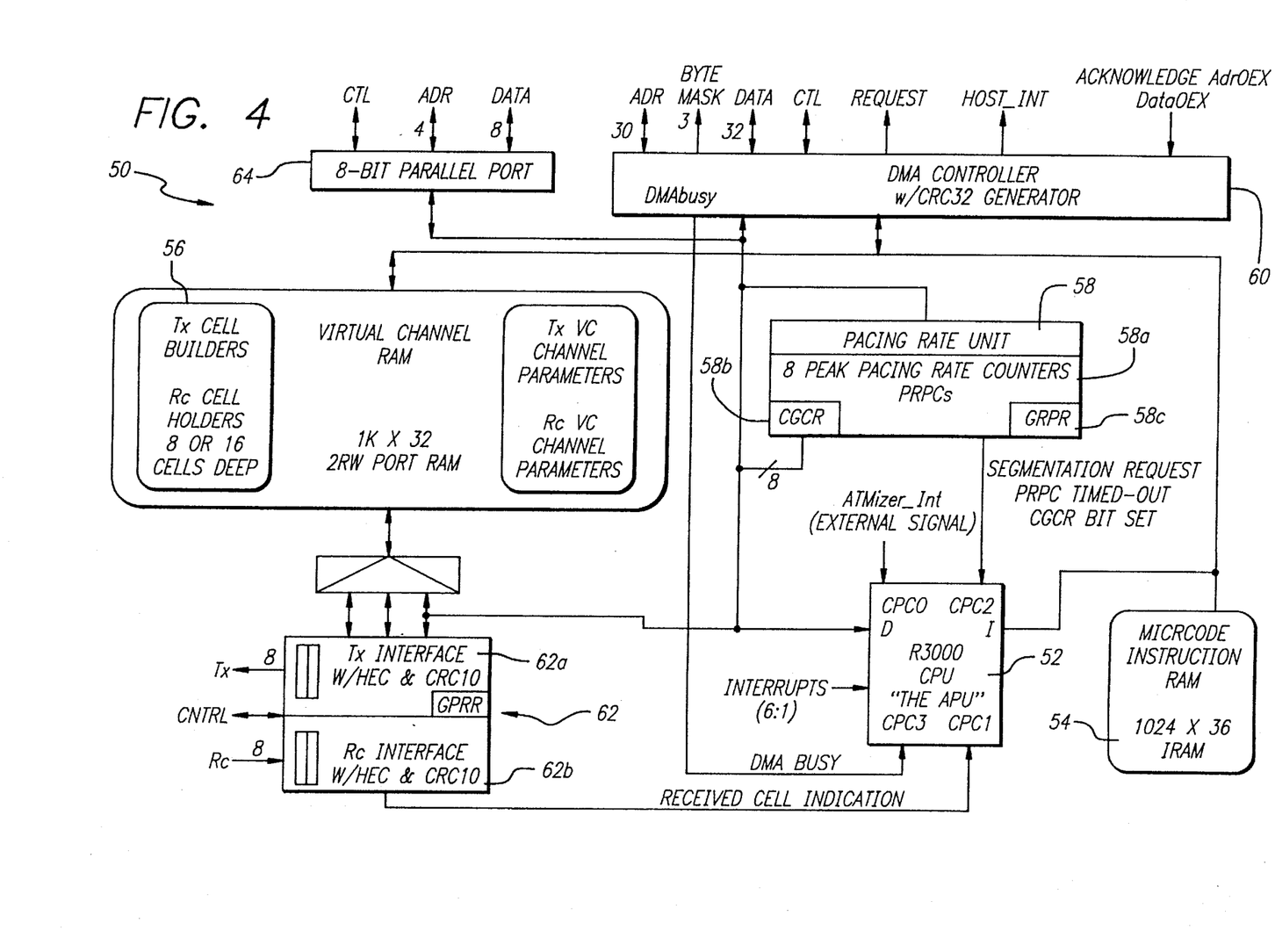
FIG. 4 is a block diagram of the ATMizer.

The ATMizer 50 consists of the following seven functional blocks as illustrated in more detail in FIG. 4.

1. ATMizer Processing Unit (APU) 52. The "brain" of the ATMizer 50 is an on board 32 bit MIPS RISC based CPU that controls all aspects of ATMizer 50 operation. This specification refers to the on-board CPU as the APU 52. The APU 52 must process every incoming cell and generate every outgoing cell. It is the APU 52 that provides the level of operational control that is necessary to support such functions as interleaved circuit termination (S&R) and cell switching of multiple ATM Adaptation Layer type cells, scatter-gather memory management operations, intelligent congestion control algorithms, traffic statistics gathering and robust ATMizer <--> Host messaging.

It will be understood that the processor is not limited to the above described embodiment, but can alternatively be constituted by a die or a section of a die including or embodying a complex logic function, i.e. one or more microprocessors or microcontrollers.

2. Instruction RAM (IRAM) 54. The APU 52 runs the user supplied firmware routine from an on-board 1024×32 single cycle SRAM which constitutes the IRAM 54. The SRAM is loaded at system reset and the code then remains static in the SRAM throughout system operation.

3. Virtual Circuit RAM (VCR) 56. The VCR 56 is the most configurable aspect of the ATMizer 50. While the VCR 56 is simply a 1024×32 two Read/Write port SRAM, the software partitioning of this SRAM will vary dramatically from user to user and application to application. Tradeoffs in VCR configuration will impact issues such as the number of channels supported and the size, structure and speed of the external main memory system.

All cells received from the ATM port side are written into the VCR 56 to await either reassembly or switching operations initiated by the APU 52. AAL 1, 2, 3/4 and 5 cells are "built" in the VCR 56 by a combination of DMA operations and APU operations before being passed to the ATM transmitter.

The VCR 56 may also be used to store Channel Parameter Entries, available buffer lists and other data structures required for system operation. In some applications, all Channel Parameters Entries will be stored in the VCR 56 while in other applications Channel Parameter Entries will be stored in main memory (combination systems are also likely).

4. Pacing Rate Unit (PRU) 58. The PRU 58 contains eight Peak Rate Pacing Counters (PRPC) 58a that are used to control the rate of CS-PDU segmentation, a Channel Group Credit Register (CGCR) 58b, which is an eight bit, APU readable/writable register containing one bit for each PRPC 58a, and a Global Rate Pacing Register (GRPR) 58c.

5. DMA Controller (DMAC) 60. The DMA controller 60 is a slave resource (as seen by the APU 52) utilized by the APU 52 to accomplish data transfers between the on-chip VCR 56 and memory mapped devices. The DMAC 60 constitutes a host interface for transferring data in host format to the host units 102, in this case DMA format. While the APU 52 is the "brains" behind DMA operations, the DMA controller 60 is the "muscle" behind such operations. Because the APU 52 initializes the DMA controller 60 at the beginning of each operation, the DMA controller 60 effectively supports an unlimited number of channels.

The DMA Controller 60 is extremely powerful, supporting every combination of local and memory byte alignments on transfers. This powerful support of aligned and misaligned operations gives the ATMizer 50 an ability to participate in robust Scatter-Gather operations. The DMA controller 60 is also responsible for generating CRC32 results for AAL 5 SAR CS-PDUs. The DMA Controller 60 operates in 32 bit address and 32 bit data transfer mode.

6. Parallel Cell Interface (PCI) 62. The PCI 62 is the ATMizer 50's network interface to the ATM network, and includes a PCI Transmitter 62a and a PCI Receiver 62b for transmission of cells in network format (48 bit Conversion Sublayer Payload Data Units (CS-PDUs)) which contain actual data, and a header and trailer. The PCI 62 is 8 bits wide in both the transmit and receive directions and connects directly to the actual Transmission Convergence Sublayer framing circuitry.

In the receive direction, the PCI 62 is responsible for reconstructing ATM cells in the VCR 56 from data received from the external framing logic. In the transmit direction, the PCI 62 is responsible for transferring cells from the VCR 56 to the external framing logic.

The PCI 62 also contains data buffers and frequency decoupling logic to allow for a direct connection between the ATMizer 50's ATM ports and the ATM line transceivers. All metastability issues are addressed and solved by the ATMizer 50.

7. Parallel Port 64. The Parallel Port 64 is an eight bit port that can be accessed by the APU 52 directly through Load and Store commands. The Parallel Port 64 may be used to pass information between the ATMizer 50 and the system controller, between two or more ATMizers or as part of the ATMizer <—> Host messaging system.

The Parallel Port 64 can also be used to access external devices while the DMA controller 60 is busy and to pass information to an external device about an active DMA operation. In the system 100, the Parallel Port 64 is used to receive interrupt vectors from the local unit 120.

The APU 52 is a 32 bit RISC CPU based on the MIPS R3000 architecture. It is the inclusion of this powerful, user programmable CPU that gives the ATMizer 50 its unique capabilities. APU firmware is responsible for a range of functions from cell building (SAR Header and Trailer generation, ATM Header retrieval from the Channel Parameter Entry for the VC, ATM Header manipulation and insertion, and DMA operation initialization for SAR SDU retrieval) to ATMizer <—> Host messaging and channel servicing sequencing.

The system designer is responsible for writing the firmware that will be executed by the APU 52. Firmware is downloaded to the ATMizer 50 at system reset and controls almost all operational functions of the ATMizer 50 including the following functions:

The APU 52 is responsible for generating SAR Headers (AAL 1, 2 and 3/4) and Trailers (AAL 2 and 3/4) during segmentation and reassembly (the CRC10 field is automatically generated and inserted by the PCI 62). SAR Header generation includes sequence number generation and checking as well as message type insertion and extraction (BOM, COM, EOM, SSM).

The APU 52 is also responsible for initiating the appropriate DMA operations to accomplish SARSDU retrieval from memory based real time data buffers (AAL 1) or CS-PDUs. The APU 52 is also responsible for ATM Header retrieval and manipulation, including PTI and CLP field modification. For cells that are to be switched, the APU 52 is responsible for making the initial switching decision based on information contained in the Channel Parameter Entry for the VC as well as for accomplishing VCI/VPI translation if such an operation is specified in the Channel Parameter Entry.

Figure 5:
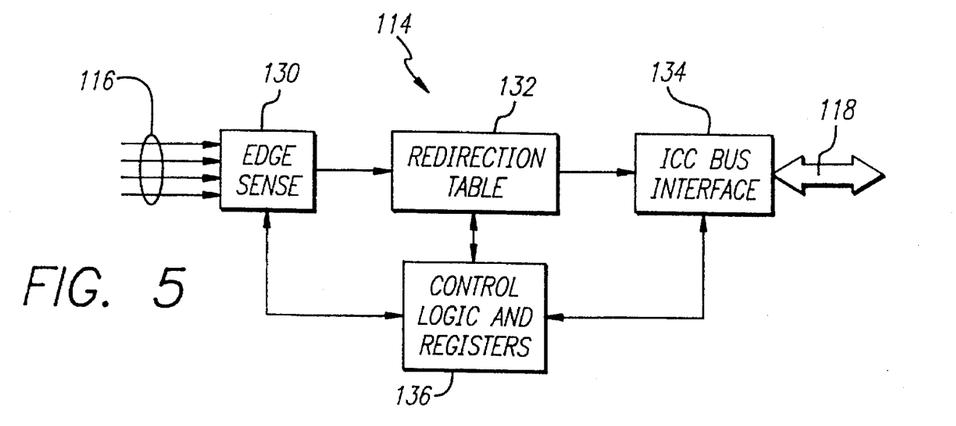
FIG. 5 is a block diagram illustrating the main functional units of an Input/Output (I/O) unit of an Advanced Programmable Interrupt Controller (APIC) system of the system of FIG. 2.

The I/O unit 114 of the APIC system 110 is illustrated in FIG. 5. The unit 114 comprises an edge sense unit 130 which senses interrupts applied to the interrupt lines 116 in the form of an edge or a level. The unit 114 further comprises a redirection table 132 for the interrupt input lines 116. Each entry in the redirection table 132 can be individually programmed to indicate which vector and also what priority the interrupt has, and which of the host units 102 should service the interrupt.

The logic circuitry and storage registers for implementing the functionality of the I/O unit 114 are collectively designated as a control logic and register unit 136. The unit 136 selects the entry in the redirection table 132 corresponding to a received interrupt and uses the information in the entry to format an interrupt request message. The interface unit 134 broadcasts the message to all of the local units 120 via the ICC bus 118.

Figure 6:
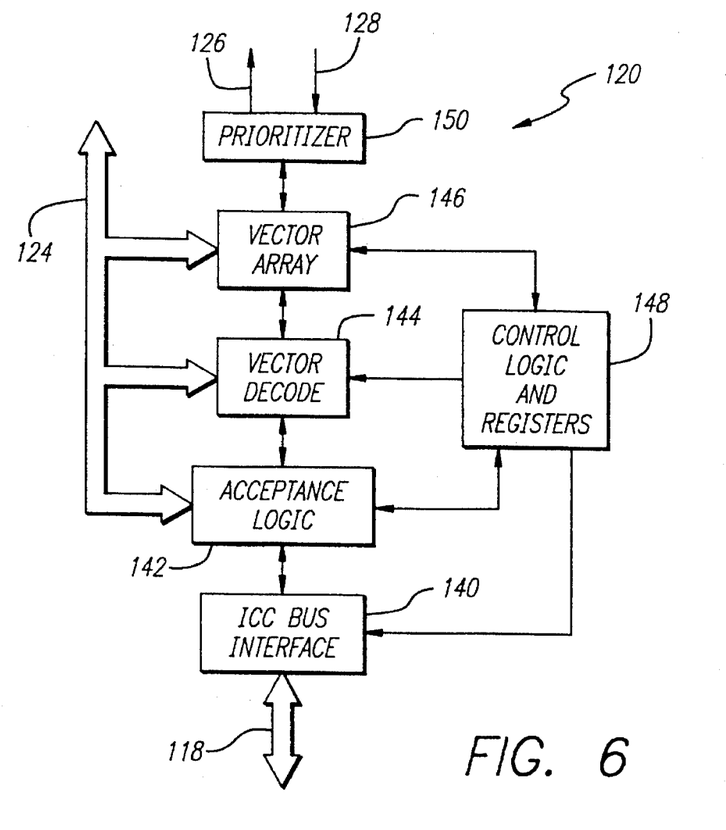
FIG. 6 is a block diagram illustrating the main functional units of a local unit of the APIC system.

Each local unit 120 as illustrated in FIG. 6 has the necessary logical functionality for determining whether or not the respective host unit 102 should accept interrupt messages sent on the ICC bus 118 from the I/O unit 114 and/or other local units 120. The local unit 120 also provides local pending of interrupts, nesting and masking of interrupts, and handles all transactions with the respective host unit 102.

Interrupt request messages received from the ICC bus 118 via an ICC bus interface 140 are applied to an acceptance logic unit 142. Each interrupt message includes a vector indicating to which host unit 102 the interrupt is addressed. It will be noted that a particular interrupt can be serviced by more than one host unit 102 on a prioritized basis, and that a particular vector can designate more than one host unit 102.

A vector decode unit 144 decodes the vector in the interrupt message by referring to a vector array 146. Under control of a control logic and register unit 148, the local unit 120 determines whether or not the interrupt is addressed to the respective host unit 102 and, if so, prioritizes the interrupt message and applies an interrupt to the respective termination unit 50 via a prioritizer unit 150 and the interrupt line 126.

The local unit 120 also applies an associated interrupt vector to the termination unit 50 over the data/address bus 124. This vector constitutes a starting address for stored program code which controls the host unit 102 to perform the operation designated by the interrupt vector.

The termination unit 50 coordinates the interrupt request with the data communication operations being performed and, at a suitable timing determined by the operating program stored in the IRAM 54, applies the interrupt signal and vector to the host unit 102. The interrupt vector is transmitted over the DMA bus 104. In response to the interrupt on the line 106, the host unit 102 suspends its current operation in a timely manner and services the interrupt.

As described above, a subset consisting of several devices of the system 100 are provided on a single integrated chip in accordance with the present invention. This significantly increases the operating speed of the system 100 by reducing latencies and eliminating multiple clock cycles required for data transfer.

Figure 7:
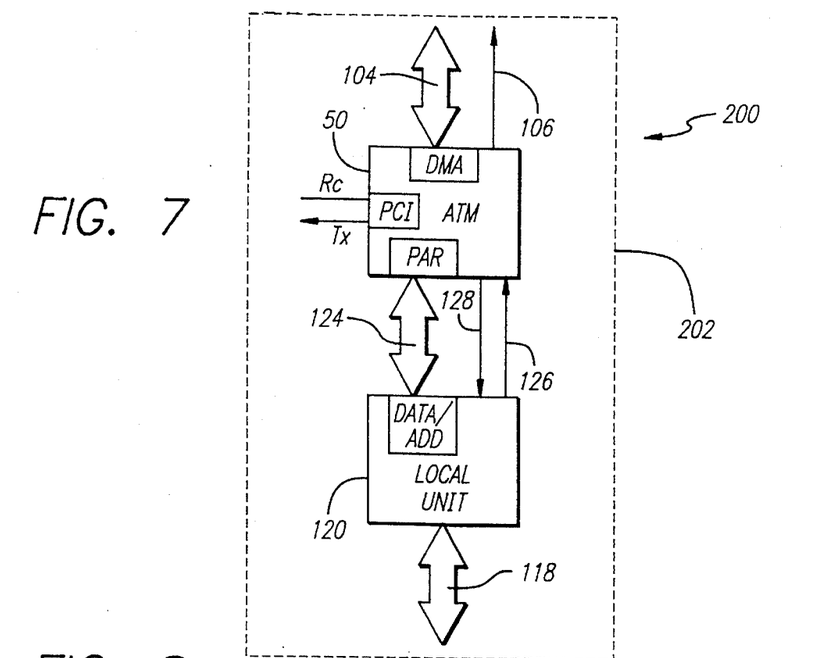
FIG. 7 is a diagram illustrating an ATM termination unit and an APIC local unit provided on a single integrated circuit chip.

As illustrated in FIG. 7, a module 200 comprises an integrated circuit substrate 202 on which a single local unit 120 and a single termination unit 50 are provided. Although not illustrated in detail, the module 200 constitutes an integrated circuit which further comprises terminals for interconnection with the other elements of the system 100 as described with reference to FIG. 2.

Figure 8:
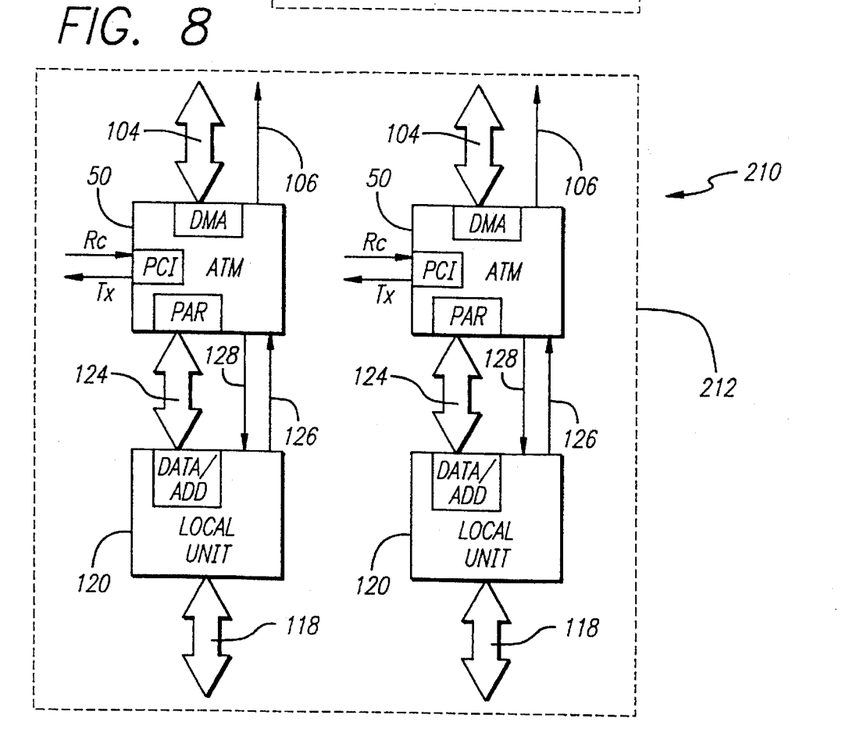
FIG. 8 is similar to FIG. 7, but illustrates two ATM termination units and APIC local units provided on a chip.

This concept is expanded as illustrated in FIG. 8, in which a module 210 comprises a substrate 212 on which two or more (only two are shown) interconnected local units 120 and termination units 50 are provided.

Figure 9:
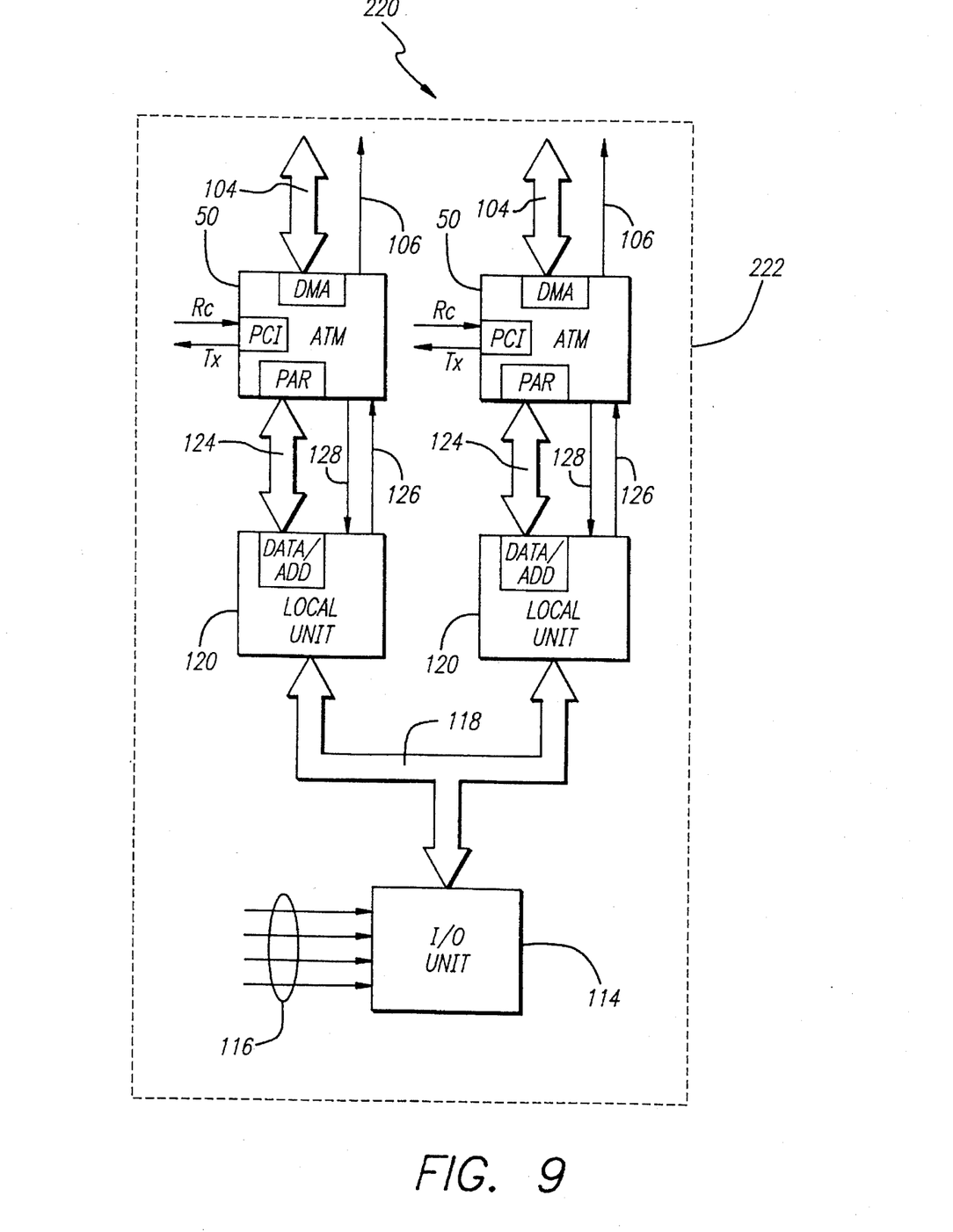
FIG. 9 is similar to FIG. 8, but additionally illustrates an APIC I/O unit formed on the chip.
Figure 10:
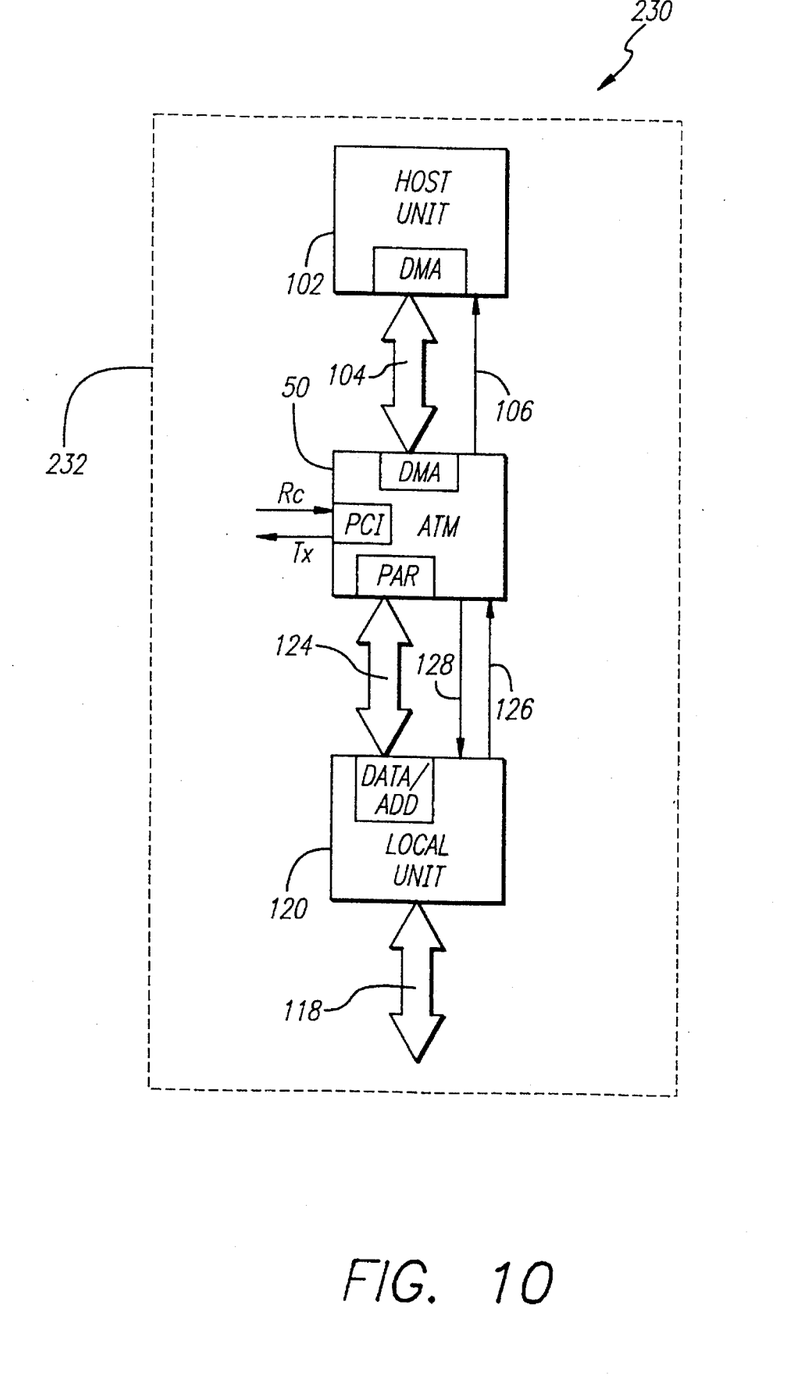
FIG. 10 is similar to FIG. 7, but additionally illustrates a host unit in the form of a processor formed on the chip.

FIG. 9 illustrates how an I/O unit 114 can be further provided on a module 220 comprising a substrate 222 and one or more interconnected local units 120 and termination units 50. FIG. 10 illustrates another module 230 embodying the present invention comprising a substrate 232 on which an interconnected local unit 120, termination unit 50 and host unit 102 are provided.

Although only one set of these units are shown in FIG. 10, any number of sets can be provided in a single integrated circuit chip or module. The arrangement of FIG. 10 is especially applicable to an arrangement in which the host units are microprocessors.

Since the APIC system 110 processes interrupts in parallel with the data processing operations in accordance with the present invention, data overrun, data loss, and/or system malfunction will not occur. Interrupts are prioritized and distributed in a highly efficient manner.

The operating program for the processor of each termination unit 50 is stored in volatile Instruction Random Access Memory (IRAM) 54 in the form of firmware which is downloaded at initialization. The program can be user designed to accommodate changes in ATM network protocols and congestion handling routines, thereby overcoming the drawbacks of the prior art.

Any of the illustrated embodiments of the invention can be implemented as a system level device including one or more Single-Chip-Modules (SCM), often including other electrical components (such as capacitors); Multi-Chip-Modules (MCM) having 2 or more integrated circuits with or without other electrical components; and board level products (BLP), such as those having multiple integrated circuits on a resin printed circuit or substrate board.

The invention can be further embodied as including one or more box level products ("Boxes"), which may include a combination of elements from the list of SCM, MCM, BLP, or other devices, and may also include a power supply.

The present system provides numerous advantages over the prior art, especially in an embodiment in which an ATM termination unit and an APIC local unit are provided on a single integrated circuit chip.

Off-chip memory access delays and latencies involved in conventional network interconnect devices are eliminated. Such integration enables the present system to operate at substantially higher speeds than conventional devices. The integrated circuit chip can be easily plugged into a socket in highly divergent types of network and host devices, thereby providing a highly desirable and cost-efficient replacement for conventional large, expensive and inflexible network interconnects and interrupt handling architecture.

The system cost is reduced through lower chip count, and the chip cost is reduced due to lower pin count. The APIC local unit can interface directly to an industry standard chip which includes an APIC I/O unit such that standard operation system software can be used with minimal modification.

In addition, power consumption is reduced due to a higher level of circuit integration, and the APIC interrupt bus can be scaled up to provide more ATM units in the system without any changes.

Various modifications will become possible for those skilled in the art after receiving the teachings of the present disclosure without departing from the scope thereof.

We claim:

1. A system for connecting an electronic data network to a plurality of host units, the network transferring data in the form of cells, comprising:

(a) a plurality of termination units connected between the network and the host units respectively, each termination unit comprising:
   (1) a cell memory for storing cells;
   (2) a processor for converting cells between a data network format and a host format;
   (3) a network interface for transferring cells in the network format between the cell memory, the processor and the network; and
   (4) a host interface for transferring cells in the host format between the cell memory, the processor and a respective host unit;
   (5) each said processor comprising:
      (i) a computing unit; and
      (ii) an instruction memory for storing a program for controlling the computing unit;

(b) an Advanced Programmable Interrupt Controller (APIC) system for distributing interrupts from the network to the host units, the APIC system comprising:
   (1) a plurality of local units for prioritizing and passing interrupts to the termination units respectively; and
   (2) an Input/Output (I/O) unit for receiving interrupts from the network, and feeding interrupts to local units corresponding to host units to which interrupts are addressed.

2. A system as in claim 1, further comprising:

a bus for interconnecting the I/O unit and the local units;

the I/O unit including:
      redirection logic comprising entries specifying host units to which received interrupts are directed; and
      an interface unit for sending interrupts to the bus with vectors indicating host units to which interrupts are addressed; and each local unit including a vector decoding unit for decoding vectors of interrupts on the bus and accepting only interrupts having vectors corresponding to a respective host unit.

3. A system as in claim 1, in which the processor uses a Reduced Instruction Set Computer (RISC) instruction set.

4. A system as in claim 1, in which the instruction memory comprises a storage unit and means for downloading the program into the storage unit.

5. A system as in claim 1, in which the network interface comprises a Direct Memory Access (DMA) controller for transferring the cells in the host format between the memory and the host unit.

6. A system as in claim 5, in which the processor controls the DMA controller.

7. A system as in claim 1, further comprising an auxiliary port for interconnecting the memory and the host unit independently of the host interface.

8. An Asynchronous Transfer Mode (ATM) network termination system, comprising:

an ATM termination unit; and an Advanced Programmable Interrupt Controller (APIC) local unit for prioritizing and passing interrupts to the termination unit.

9. A system as in claim 8, in which:
the termination unit comprises:
a virtual channel memory for storing ATM cells; and
a processor for segmenting and reassembling ATM cells stored in the virtual channel memory.

10. A system as in claim 8, further comprising a processor which includes:
a computing unit; and
an instruction memory for storing a program for controlling the computing unit.

11. A system as in claim 8, further comprising a bus, in which the local unit comprises a vector decoding unit for decoding vectors of interrupts on the bus and accepting only interrupts having vectors corresponding thereto.

12. An Asynchronous Transfer Mode (ATM) network termination system. comprising;
an ATM termination unit;
an Advanced Programmable Interrupt Controller (APIC) local unit for prioritizing and passing interrupts to the termination unit: and
said termination unit and said local unit are formed on a single integrated circuit chip.

13. A system as in claim 12, further comprising:
an additional ATM termination unit formed on the integrated circuit chip:
an additional APIC local unit formed on the integrated circuit chip for prioritizing and passing interrupts to the additional termination unit; and
an APIC Input/Output (I/O) unit formed on the integrated circuit chip for receiving interrupts, determining to which of the termination unit and the additional termination unit interrupts are addressed, and feeding interrupts to the local unit or the additional local unit corresponding to the termination unit or the additional termination unit to which interrupts are addressed.

14. A system as in claim 12, further comprising an APIC Input/Output (I/O) unit formed on the integrated circuit chip for receiving interrupts, and feeding only interrupts which are addressed to the local unit thereto.

15. A system as in claim 12, further comprising a host unit which is formed on the integrated circuit chip and operatively connected to the termination unit.

16. A system as in claim 15, in which the host unit comprises a processor.

17. A system for connecting an Asynchronous Transfer Mode (ATM) data network to a plurality of host units, the data network transferring data in the form of cells, comprising:
(a) a plurality of ATM termination units connected between the network and the host units respectively, each termination unit comprising:
(1) a cell memory for storing ATM cells;
(2) a processor for segmenting and reassembling the ATM cells stored in the memory;
(3) a network interface for transferring ATM cells including segmented Conversion Sublayer Payload Data Units (CS-PDU)s between the memory, the processor and an ATM network; and
(4) a host interface for transferring unsegmented CS-PDUs between the memory, the processor and a host unit;
(b) an Advanced Programmable Interrupt Controller (APIC) system for distributing interrupts from the network to the host units.

18. A system as in claim 17, in which the processor of each termination unit includes:
a computing unit; and
an instruction memory for storing a program for controlling the computing unit.

19. A system as in claim 17, in which the APIC system includes:
a plurality of local units for prioritizing and passing interrupts to the termination units respectively; and
an Input/Output (I/O) unit for receiving interrupts from the network, determining to which host units interrupts are addressed, and feeding interrupts to local units corresponding to host units to which interrupts are addressed.

20. A system as in claim 19, further comprising:
a bus for interconnecting the I/O unit and the local units:
the I/O unit including:
a redirection table comprising entries designating to which host units specified interrupts are directed; and
an interface unit for sending interrupts to the bus with vectors indicating host units to which interrupts are addressed.

21. A system as in claim 20, in which each selected local unit further comprises a vector decoding unit for decoding vectors of interrupts on the bus and accepting only interrupts having vectors corresponding to a respective host unit.

22. A system as in claim 17, in which the processor uses Reduced Instruction Set Computer (RISC) instructions.

23. A system as in claim 22, in which the processor controls the memory, the network interface and the host interface using single clock cycle instructions.

24. A system as in claim 17, in which the instruction memory comprises a storage unit and means for downloading the program into the storage unit.

25. A system as in claim 17, in which the network interface comprises a Direct Memory Access (DMA) controller for transferring unsegmented CS-PDUs between the memory and the host unit.

26. A system as in claim 25, in which the processor controls the DMA controller.

27. A system as in claim 17, further comprising an auxiliary port for interconnecting the memory and the host unit independently of the host interface.

28. A system as in claim 27, in which the auxiliary port comprises a parallel interface.

29. A system as in claim 17, further comprising a global rate pacing unit for automatically reducing a maximum allowable transmission ratio of ATM cells containing information to idle ATM cells in response to a congestion condition in the ATM network.

30. A system including an electronic device for connecting an Asynchronous Transfer Mode (ATM) data network to a plurality of host units, the data network transferring data in the form of cells, comprising:
a plurality of ATM termination units connected between the network and the host units respectively, each selected termination unit including:
a cell memory for storing ATM cells;
a processor for segmenting and reassembling the ATM cells stored in the memory;
a network interface for transferring ATM cells including segmented Conversion Sublayer Payload Data Units (CS-PDU)s between the memory, the processor and an ATM network; and
a host interface for transferring unsegmented CS-PDUS between the memory, the processor and a host unit;

the system further comprising an Advanced Programmable Interrupt Controller (APIC) system for distributing interrupts from the network to the host units.

31. A system as in claim 30, in which the processor of each termination unit includes:
   a computing unit; and
   an instruction memory for storing a program for controlling the computing unit.

32. A system as in claim 30, in which the APIC system includes:
   a plurality of local units for prioritizing and passing interrupts to the termination units respectively; and
   an Input/Output (I/O) unit for receiving interrupts from the network, determining to which host units interrupts are addressed, and feeding interrupts to local units corresponding to host units to which interrupts are addressed.

33. A system as in claim 32, further comprising:
   a bus for interconnecting the I/O unit and the local units:
   the I/O unit including:
      a redirection table comprising entries designating to which host units specified interrupts are directed; and
      an interface unit for sending interrupts to the bus with vectors indicating host units to which interrupts are addressed.

34. A system as in claim 33, in which each local unit further comprises a vector decoding unit for decoding vectors of interrupts on the bus and accepting only interrupts having vectors corresponding to a respective host unit.

35. A system as in claim 30, in which the processor uses Reduced Instruction Set Computer (RISC) instructions.

36. A system as in claim 35, in which the processor controls the memory, the network interface and the host interface using single clock cycle instructions.

37. A system as in claim 30, in which the instruction memory comprises a storage unit and means for downloading the program into the storage unit.

38. A system as in claim 30, in which the network interface comprises a Direct Memory Access (DMA) controller for transferring unsegmented CS-PDUs between the memory and the host unit.

39. A system as in claim 38, in which the processor controls the DMA controller.

40. A system as in claim 30, further comprising an auxiliary port for interconnecting the memory and the host unit independently of the host interface.

41. A system as in claim 40, in which the auxiliary port comprises a parallel interface.

42. A system as in claim 30, further comprising a global rate pacing unit for automatically reducing a maximum allowable transmission ratio of ATM cells containing information to idle ATM cells in response to a congestion condition in the ATM network.

43. A system as in claim 30, in which the electronic device comprises a Multi Chip Module (MCM).

44. A system as in claim 30, in which the electronic device comprises a Box Level Product (BLP).

45. A system as in claim 30, in which the electronic device comprises a board level product.

46. A system including an electronic device for connecting an Asynchronous Transfer Mode (ATM) data network to a plurality of host units, the data network transferring data in the form of cells, comprising:
   (a) a plurality of ATM termination units connected between the network and the host units respectively, each selected termination Unit including;
      (1) a cell memory for storing ATM cells;
      (2) a processor for segmenting and reassembling the ATM cells stored in the memory;
      (3) a network interface for transferring ATM cells including segmented Conversion Sublayer Payload Data Units (CS-PDU)s between the memory, the processor and an ATM network;
      (4) a host interface for transferring unsegmented CS-PDUs between the memory, the processor and a host unit;
   (b) an Advanced Programmable Interrupt Controller (APIC) system for distributing interrupts from the network to the host units; and
   (c) the electronic device comprises a Single Chip Module (SCM).

* * * * *